United States Patent
Dinh et al.

(10) Patent No.: US 8,045,957 B2
(45) Date of Patent: Oct. 25, 2011

(54) COMPUTER PROGRAM PRODUCT TO INDICATE A CHARGE FOR A CALL

(75) Inventors: Hung T. Dinh, Austin, TX (US); Teng Hu, Austin, TX (US); Dinh T. Le, San Antonio, TX (US); Phong A. Pham, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 958 days.

(21) Appl. No.: 11/626,868

(22) Filed: Jan. 25, 2007

(65) Prior Publication Data

US 2008/0182552 A1    Jul. 31, 2008

(51) Int. Cl.
*H04M 11/00* (2006.01)
*H04M 1/00* (2006.01)

(52) U.S. Cl. ....... 455/407; 455/550.1; 379/84; 379/130; 379/144.01

(58) Field of Classification Search .................. 455/407, 455/550.1; 379/130, 84, 144.01
See application file for complete search history.

(56) References Cited

U.S. PATENT DOCUMENTS

| | | | | |
|---|---|---|---|---|
| 2,676,209 | A * | 4/1954 | Joel, Jr. | 379/84 |
| 4,192,972 | A * | 3/1980 | Bertoglio et al. | 379/144.01 |
| 5,828,738 | A * | 10/1998 | Spaeth | 379/130 |
| 5,907,604 | A | 5/1999 | Hsu | |
| 6,148,191 | A * | 11/2000 | Kim | 455/407 |
| 6,567,671 | B2 * | 5/2003 | Amin | 455/550.1 |
| 7,085,358 | B2 | 8/2006 | Ruckart | |
| 2004/0142707 | A1 | 7/2004 | Midkiff et al. | |
| 2004/0198351 | A1 | 10/2004 | Knotts | |

* cited by examiner

*Primary Examiner* — William D Cumming
(74) *Attorney, Agent, or Firm* — Mark C. Vallone; Schubert Law Group

(57) ABSTRACT

Embodiments may comprise hardware and/or code within a cellular phone to process data related to charges for a call to indicate the charges to the user. In some embodiments, the charges may be presented in the form of an icon. The icon may indicate whether or not charges apply to the call, a range of charges, and/or a rate of charge. Further embodiments may display characters describing conditional charges for a call. In still further embodiments, the charges for a call may be indicated by an audible alert such as a volume, frequency, pattern of frequencies, or a voice generated. Embodiments may also include hardware and/or code of a cellular phone server such as an MTSO to gather and transmit account information to a cellular phone (or apparatus with similar functionality such as a mobile broadband card).

3 Claims, 6 Drawing Sheets

FIG 6

COMPUTER PROGRAM PRODUCT TO INDICATE A CHARGE FOR A CALL

FIELD

The present disclosure relates generally to mobile phone technologies. More particularly, the present disclosure relates to methods and arrangements to indicate a charge for a call such as an indication that no charges will apply to the call beyond the current monthly fees.

BACKGROUND

Usage of cellular phone continues to rise. In fact, many individuals and businesses have become or are becoming dependent upon cellular phones, which is promoted in part by special discounts and plans offered by cellular phone service providers for various types of calls and time periods. For instance, due in part to the proliferation of usage by businesses during weekdays, many cellular phone service providers like Cingular™, T-Mobile™, Sprint™ and Verizon™ offer unlimited weekends.

Charges for phone usage are described to some extent in a service contract that a cellular phone user executes typically when purchasing a cellular phone. More specifically, service contracts typically include a monthly charge, time periods in which different rates are charged, locations from which calls can be originated without additional charges, locations to which calls may be placed without additional charges, a number of minutes that are included in the contract for the monthly fee (often referred to as anytime minutes), and other special discounted rates. Special discounts included in service contracts can include unlimited minutes over weekends such as after, e.g., 9:00 pm on Friday through 5:00 pm on Sunday, and unlimited minutes outside certain time periods during weekdays such as after 7:00 pm or 9:00 pm. Furthermore, some service contracts may offer unlimited minutes for calls between cellular phones associated with service contracts from the same cellular phone service provider.

However, in accordance with the service contracts, most provisions a restricted to time periods and/or geographic locations for the cellular phones involved with the calls. Furthermore, most service contracts include clauses that allow provisions of the contracts to be updated or modified in response to changing conditions. For instance, rates will change over time due to lease rates that cellular service providers pay for physical phone lines or data rates over the Internet.

Geographic boundaries for cellular phone providers change over time due to the availability of and contracts with cellular phone servers such as mobile telephone switching offices (MTSOs). An MTSO is a central switch that controls the entire operation of a cellular system. The MTSO is a sophisticated computer that monitors all cellular calls, tracks the location of all cellular-equipped vehicles traveling in the system, arranges handoffs, keeps track of billing information, etc. In many cities, there may be only one MTSO to handle all cellular phone calls within the city.

Each cellular phone service provider, or carrier, is assigned a unique identification number by the Federal Communications Commission (FCC) called a system identification code (SID) and each cellular phone includes the SID, e.g., on a subscriber identity module (SIM) to associate the phone with a carrier and a service contract. When a cellular phone is powered, the cellular phone looks for the frequency of a previously found MTSO and/or searches frequencies for an MTSO. Upon finding the MTSO, the cellular phone transmits the SID and the subscriber identity to the MTSO and the MTSO verifies the subscriber identity with the carrier. Upon verification, the user may send or receive calls via the MTSO.

While the average per minute charges seem to be dropping, the service contacts for cellular phone use are so complicated and subject to change that cellular phone users typically cannot figure out whether or not they will be charged for a particular call. For instance, there is no indication whether the cellular phone user will be charged is within a free time period, a geographic location that is free from additional charges, or that the user still has some remaining anytime minutes. Currently, many cellular phones indicate that the phone is "Roaming" when the phone is registered in a geographic location that is not the designated "home" location for purposes of the service contract, but "Roaming" does not actually indicate whether or not additional charges apply to a call because many service contracts include some "Roaming" areas free of additional charges.

Many cell phone carriers also offer unlimited mobile-to-mobile calling to members of the same carrier; however, there is no easy way for the end user to identify the carrier of the incoming call or of the phone that is being called without actually asking the person at the other end after initiating the call. Without this identification, the user has no way of knowing whether the user can take advantage of the unlimited mobile-to-mobile calling feature. For example, a user may not want to use anytime minutes to answer a call from an unknown or blocked caller but the user may be willing to answer if the call is free of any additional charges.

SUMMARY OF THE INVENTION

The problems identified above are in large part addressed by methods and arrangements provided herein to collect data from a system in response to an event. One embodiment comprises a method to indicate a charge for a call. The method may involve receiving data, at a wireless device from a cellular phone server, indicative of a carrier of an incoming caller, the data to associate a charge for connection with the incoming caller; processing the data to determine an indication of the charge; and outputting, via the wireless device, the indication.

Another embodiment comprises an apparatus to indicate a charge for a call. The apparatus may comprise a receiver and transmitter to register the apparatus with a cellular phone server and receive account information associated with the apparatus based upon registration with the cellular phone server for the call; rate logic to determine at least one representation for one or more charges for the call based upon the account information; and one or more output devices to output the at least one representation to communicate the one or more charges for the call to a user.

Another embodiment includes a machine-accessible medium containing instructions, which when executed by a machine, cause said machine to perform operations. The operations may comprise receiving, at a cellular phone server, a registration packet from one wireless device; accessing account information related to the one wireless device from a cellular phone service provider, wherein the account information comprises data related to remaining minutes available that will incur no charge for use; and transmitting the data to the one wireless device.

BRIEF DESCRIPTION OF THE DRAWINGS

Aspects of the invention will become apparent upon reading the following detailed description and upon reference to the accompanying drawings in which like references may indicate similar elements.

DETAILED DESCRIPTION OF EMBODIMENTS

The following is a detailed description of novel embodiments depicted in the accompanying drawings. The embodiments are in such detail as to clearly communicate the subject matter. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

Generally, methods and arrangements to indicate a charge for a call are described herein. Embodiments may comprise hardware and/or code within a cellular phone to process data related to charges for a call to indicate the charges to the user. In some embodiments, the charges may be presented in the form of an icon. The icon may indicate whether or not charges apply to the call and, in a number of embodiments, the icon may indicate a range of charges and/or a rate of charge. For instance, the cellular phone may display the carrier in the form of an icon with the calling/receiving phone number so that the carrier is visible to the user. Such embodiments are advantageous for service contracts in which no additional charges apply to calls between phones of the same carrier. Also, the cellular phone may store the carrier icon with the saved phone number in the contact list so the user can see the carrier prior to initiating the call. In many embodiments, the carrier identification in the contact list can be updated automatically each time the cellular phone connects to the number. In several embodiments, one or more carrier icons are preloaded in the subscriber identity module (SIM) when the phone is purchased from the carrier.

Further embodiments may display characters describing charges or conditional charges for a call, or at least indicating that charges apply. In still further embodiments, the charges for a call may be indicated by an audible alert such as a volume, frequency, pattern of frequencies, or a voice generated when the cellular phone receives an incoming call. For instance, an embodiment may indicate one or more fixed fees or rates of charge when the cellular phone registers with an MTSO. If all calls will be free (of additional charges), the cellular phone may simply indicate so. Otherwise, the cell phone may indicate that charges apply to calls from the current location or within the current time period by displaying the charges and/or providing an audible alert.

In further embodiments, the cellular phone may display the fixed fees and charges potentially incurred based upon various conditions. For example, if the service contract is a local area plan, the cellular phone may indicate that local calls are free and/or that calls outside the local area will incur charge. Furthermore, if the cellular phone is outside the local area or "home" area indicated by the service contract, the cellular phone may indicate that charges will apply to calls, fixed charges will apply to the call, and/or a rate of charge will apply to a call. If the charges only apply to outgoing calls, some embodiments may also indicate such.

Embodiments may also include hardware and/or code of a cellular phone server such as an MTSO to gather and transmit account information to a cellular phone (or apparatus with similar functionality such as a mobile broadband card). For instance, some embodiments comprise an MTSO with registration logic to gather account information related to the service contract for a particular subscriber identity. The registration logic may transmit some or all of the account information to the corresponding cellular phone. In further embodiments, the MTSO may gather account information such as the SID for a cellular phone that is being called or that is calling. The SID may then be transmitted to the other cellular phone. In several embodiments, the MTSO may compare the SID to an SID of one of the cellular phones and transmit an indication whether or not the SID is for the same carrier.

While specific embodiments will be described below with reference to specific memory devices, circuits, or logic configurations, those of skill in the art will realize that embodiments of the present disclosure may advantageously be implemented with other memory devices, circuits, and logic configurations.

Figure 1:
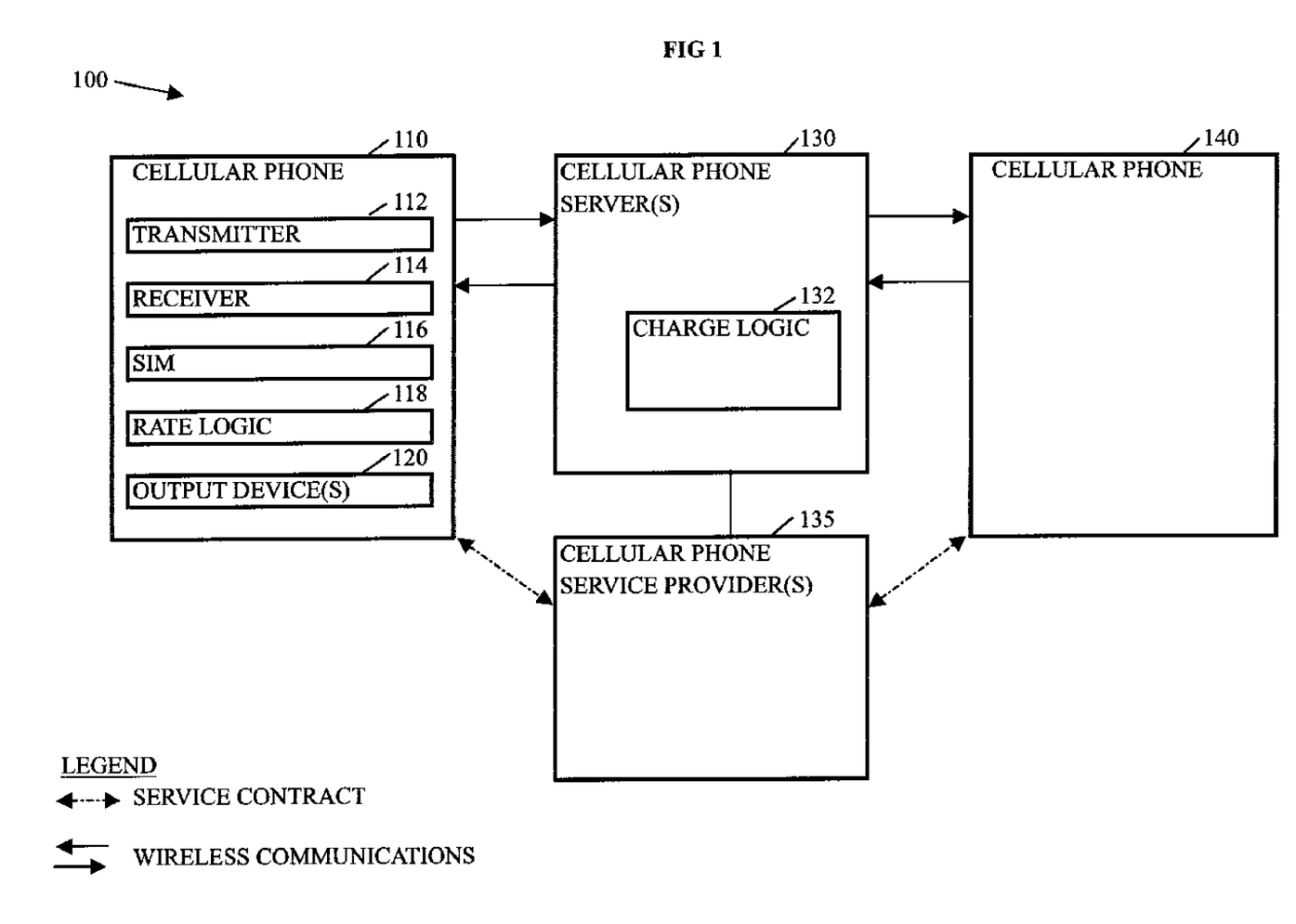
FIG. 1 depicts a cellular phone system including cellular phones, a cellular phone server and a cellular phone service provider.

Turning now to FIG. 1, there is shown a cellular phone system 100 including cellular phones 110 and 140, cellular phone server(s) 130 and cellular phone service provider(s) 135. Cellular phone system 100 may be a general purpose or specific purpose computer system such as a distributed computing system, supercomputer, high-performance computing system, computing cluster, mainframe computer, client-server system, workstation, server, or other device for establishing and maintaining connections between cellular phones, mobile broadband cards or the like. For example, cellular phones 110 and 140 may register with cellular phone server(s) 130 when powered on. Cellular phone server(s) 130 may verify service contracts for cellular phones 110 and 130 with cellular phone service provider(s) 135. Upon verifying service, cellular phone server(s) 130 may facilitate phone calls to and from cellular phones 110 and 140.

Cellular phone system 100 also optionally includes a telephone network or other network in communication with cellular phone server(s) 130. Cellular phone 110 is a mobile communication device, such as a mobile broadband card connected to a computer executing a software ('soft') phone that is adapted to communicate wirelessly via cellular phone system 100. In one embodiment, cellular phone 110 may communicate with a relay station as part of cellular phone server(s) 130, which in turn is in communication with a mobile telephone switching office (MTSO), gateway mobile switching center ("GMSC"), or other elements of a wireless or cellular network. In one embodiment, cellular phone server (s) 130 communicate with a telephone network (or other wireless or cellular networks) via a GMSC. Cellular phone server(s) 130, in a further embodiment, communicate with the Internet or other network using the Wireless Access Protocol ("WAP") via a WAP gateway, which translates between the protocols of the WWW and the WAP protocols of cellular phone 110.

Cellular phone 110 may receive charge information from cellular phone server(s) 130 and indicate the charge information to a user via output devices of cellular phone 110 such as a speaker, light emitting diodes (LEDs), a liquid crystal display (LCD), or the like. For example, when cellular phone 110 is powered, cellular phone 110 may transmit a registration packet to cellular phone server(s) 130 via transmitter 112. Upon verification of service, cellular phone server(s) 130 may gather account information from cellular service provider(s) 135 such as one or more charges based upon the location of cellular phone 110 and transmit the one or more charges to cellular phone 110. Cellular phone 110 may receive the charges via receiver 114 and display the one or more charges as characters on a display of output devices 120, indicate the charges by changing the illumination behind the keys and/or changing the illumination of the display, and/or indicate the charges via an audible alert. Changing the illumination, for instance, may involve adjusting the color and/or brightness of the light generated by output devices 120 of cellular phone 110 such as an LED, LCD, or other light source.

Transmitter 112 and receiver 114 may communicate with a transmitter and receiver of cellular phone server(s) 130 via one or more cellular access technologies such as time division multiple access (TDMA), code division multiple access (CDMA), and/or global system for mobile communications (GSM). TDMA assigns each connection (or call) a portion of time on a designated frequency such as 6.7 milliseconds of a narrow band that is 30 kHz wide and split time-wise into three portions or time-slots. The Electronics Industry Alliance and the Telecommunications Industry Association uses TDMA for Interim Standard 54 (IS-54) and Interim Standard 136 (IS-136).

CDMA gives a unique sequence code to each call and spreads digitized data over the available bandwidth. Multiple calls are overlaid on each other on a channel, with each assigned a unique sequence code. CDMA is a form of spread spectrum, which sends data out over a number of discrete frequencies. GSM implements encryption with a form of TDMA.

Subscriber identity module (SIM) 116 may be memory to maintain a subscriber identifier and a system identification code (SID) to identify a carrier of cellular phone service provider(s) 135. In many embodiments, SIM 116 is a smart card roughly the size of a postage stamp that securely stores the key identifying a mobile phone service subscriber, as well as subscription information, saved telephone numbers, preferences, text messages and other information. SIM 116 may store network state information such as its current Location Area Identity (LAI). For instance, after cellular phone 110 is turned off and powered on again, cellular phone 110 may retrieve data off SIM 116 to search for the most recent LAI, preferred LAIs, and/or frequently accessed LAIs, advantageously avoiding a search of a list of frequencies in many situations. SIM 116 may be uniquely identified by its international circuit card identification (ICCID).

Rate logic 118 may determine an indication, or at least one representation, for a charge by processing data such as account information received from cellular phone server(s) 130 and display or otherwise output the indication for the user so the user can make an informed decision regarding whether to place a call or accept a call. In many embodiments, rate logic 118 may determine at least one representation for one or more rates of charge for the call by processing the data to determine the one or more rates of charge. For example, upon receipt of a call from a cellular phone 140 at cellular phone server(s) 130, cellular phone server(s) 130 may transmit the SID associated with cellular phone 140 to cellular phone 110. Rate logic 118 may receive the SID and compare the SID to the SID associated with cellular phone 110 in SIM 116. If the SIDs represent the same carrier of cellular phone service provider(s) 135, rate logic 118 may determine an indication for such to output to the user so the user will know that the call will be free of charges beyond the standard monthly service fees.

In several embodiments, rate logic 118 may display the phrase "free of charge" or generate an audible alert to indicate the call is free of charge. In further embodiments, the preferences may indicate a default indication and/or an indication preferred by the user. For instance, the user may set the cellular phone to meeting mode so all sounds may be muted and rate logic 118 may instead just display the rate information or generate a pattern of vibrations or lights to indicate that the call is free of additional charges.

Similarly, when placing a call, rate logic 118 may access a contact list in SIM 16 or other memory of cellular phone 110 to determine whether the phone number to be called has most recently been associated with the same carrier. If the cellular phone to be called is associated with the same carrier in the contact list, rate logic 118 may provide a corresponding indication. In many embodiments, rate logic 118 may allow the user to provisionally place the call based upon the carrier being the same carrier. For instance, rate logic 118 may transmit the call request for cellular phone 140 to cellular phone server(s) 130 and receive an SID or other indication of the carrier associated with cellular phone 140. If cellular phone 140 is not associated with the same carrier, rate logic 118 may update the carrier information in the contact list of cellular phone 110 and terminate the call. On the other hand, if the carrier is the same, the call may be completed. In some embodiments, rate logic 118 may offer carrier verification logic to connect with cellular phone server(s) 130 to update carrier information for a cellular phone number. In further embodiments, rate logic 118 may automatically update carrier information of cellular phone numbers in a contact list of cellular phone 110. In still further embodiments, cellular phone server(s) 130 may include logic to facilitate updates of carrier information and may interact with rate logic 118 during a call to update carrier information for more than one cellular phone numbers in the contact list of cellular phone 110.

Cellular phone server(s) 130 may comprise a server to facilitate cellular phone communications such as logic to verify subscription and/or other account information, logic to pass rate information to cellular phone 110, and logic to connect calls to/from other phones such as cellular phone 140. Cellular phones server(s) 130 may include transmitters and receivers for cellular access technologies and optionally for Internet communication technologies and private branch exchange (PBX) technologies. For instance, cellular phone server(s) 130 may comprise one or more MTSOs interconnected with Internet gateways and a PBX server.

In some embodiments, cellular phone server(s) 130 may include charge logic 132 to process rate information and to provide resulting data to cellular phones such as cellular phone 110. For example, upon receipt of a request to call cellular phone 140 from cellular phone 110, cellular phone server(s) 130 may compare the carriers of cellular phone 110 and 140 to determine whether the carriers are the same and, if so, transmit an indication of such to cellular phone 110 and/or 140 prior to connecting the call. In many embodiments, cellular phone server(s) 130 may await confirmation from cellular phone 110 and/or cellular phone 140 prior to connecting the call.

In further embodiments, cellular phone server(s) 130 may comprise charge logic 132 to determine charges for a call between cellular phones 110 and 140 and transmit data representative of the charges to cellular phone 110 and/or cellular phone 140. For instance, charge logic 132 may request account information from cellular phone service provider(s) 135 based upon the SID and subscriber identification provided to cellular phone server(s) 130 by cellular phones 110 and 140 and transmit the charge information to cellular phone 110 and/or cellular phone 140 prior to connecting the call. In some embodiments, charge logic 132 may first verify the intent to complete the call via the initiating cellular phone after transmitting the charge information and may then verify the intent to receive the call by the receiving cellular phone after transmitting the charge information.

Cellular phone service provider(s) 135 may comprise servers with access to account information related to service contracts for cellular phones such as cellular phones 110 and 140. Cellular phone service provider(s) 135 may include hardware and code representing one or more carriers. In some embodiments, cellular phone service provider(s) 135 may provide charges such as fees and rates of charge to cellular phone server(s) 130 in response to requests for account information. In many embodiments, cellular phone service provider(s) 135 may provide a single rate based upon circumstances surrounding a call request. In other embodiments, cellular service provider(s) 135 may provide more than one charge to cellular phone server(s) 130 in response to requests for one or more situations. For example, cellular phone server(s) 130 may provide that SID and subscriber identification of cellular phones 110 and 140 and receive a response from cellular phone service provider(s) 135 with indications for charges for each phone. In other embodiments, cellular phone service provider(s) 135 may respond to SID and subscriber identification of cellular phones 110 and 140 with a number of remaining anytime minutes associated with one or both phones as well as one or more rates that will apply once the remaining anytime minutes are used up.

In several embodiments, cellular phone service provider(s) 135 may supply a data packet to cellular phone server(s) 130 in response to a request for account information. In some embodiments, the data packet may be encrypted. Cellular phone server(s) 130 may transmit the data packet to cellular phone 110 and rate logic 118 may decrypt the data packet via, e.g., a private key, to determine charges.

Figure 2:
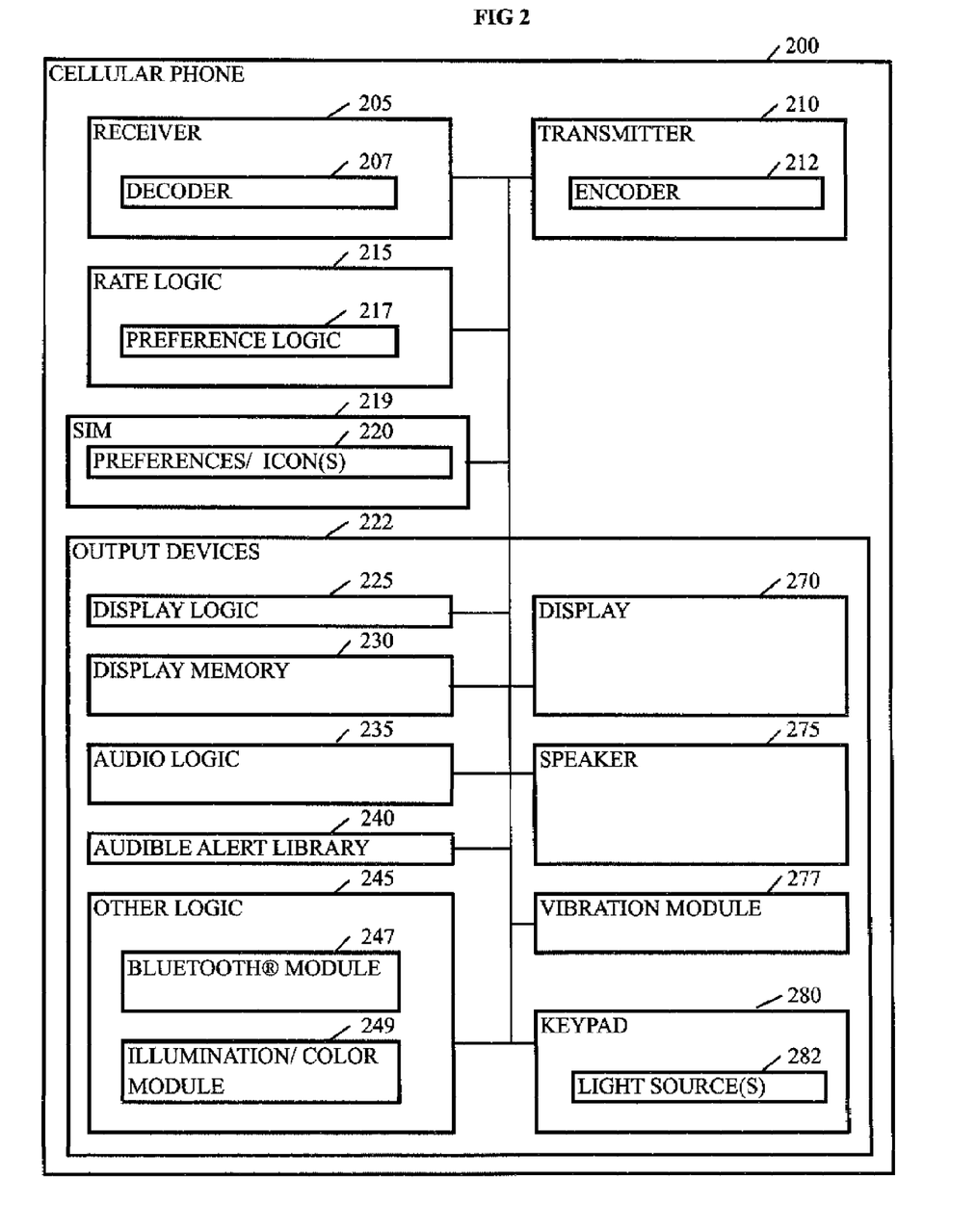
FIG. 2 depicts an embodiment of a cellular phone to indicate a charge for a call.

FIG. 2 depicts an embodiment of a cellular phone 200 to indicate a charge for a call. In this embodiment, cellular phone 200 comprises a receiver 205, a transmitter 210, rate logic 215, a subscriber identifier module (SIM) 219, and output devices 222. Receiver 205 and transmitter 210 may send and receive wireless communications via one or more wireless protocols. In the present embodiments, receiver 205 comprises a decoder 207 to decode incoming messages. Decoder 207 may verify data such as error correction data, parity data, checksums, or the like for digitized audio packets. In several embodiments, encoder 207 may decompress and/or decrypt the digitized audio packets.

Transmitter 210 comprises an encoder 207 to encode outgoing messages. Encoder 207 may add data such as error correction data, parity data, checksums, or the like to digitized audio packets. In several embodiments, encoder 207 may compress and/or encrypt the digitized audio packets.

Rate logic 215 may process data received from a cellular phone server to determine charges associated with a call. In many embodiments, rate logic 215 is adapted to process a measurement of remaining anytime minutes, a rate of charge, more than one rates of charges, and/or one or more additional fees. Processing the rates of charge may comprise associating characters with more than one conditional rates of charge. The more than one conditional rates of charge may be dependent upon characteristics of the connection such as the MTSOs through which the call is connected, the time of the day at which the call is placed, or other characteristics that may affect charges in accordance with a service contract.

Rate logic 215 may communicate with SIM 219 to obtain data about the cellular phone registration and carrier and may communicate with output devices 222 to output indications related to charges to a user. For example, rate logic 215 may retrieve an icon from preferences/icons 220 that is indicative of a call that is free of charge or vice versa. Rate logic 215 may then store the icon or a reference to the icon in display memory 230 to display the icon on display 270.

Rate logic 215 comprises preference logic 217 to adjust output of indications of a charge for a call. In particular, preference logic 217 may access preferences/icons 220 of SIM 219 to determine default or user preferences related to the output of indications for charges. A user may select preferred icons, text, audible alerts, or illuminations/colors to indicate charges for a call and cellular phone 200 may store the preferences in preferences/icons 220. For example, a user of cellular phone 200 may store a preference indicating that cellular phone should provide a green illumination for incoming and outgoing calls that will be free and a red illumination for calls that will incur fees or rates of charge in addition a minimum monthly charge. In response to an incoming call, rate logic 215 may determine that the incoming call will not result in a charge against cellular phone 200 so preference logic 217 may access preferences/icons 220 to determine how to indicate such to the user of cellular phone 200. Upon determining that the user prefers cellular phone 200 provide a green illumination, rate logic 215 may transmit an instruction to display memory 230 and other logic 245 to illuminate or project green from display 270 of output devices 222 and with light sources 282 behind keypad 280 of output devices 222. The user of cellular phone 200 may then see a green glow from cellular phone 200 as cellular phone 200 receives the incoming call. Similarly, if a fixed fee or rate of charge is associated with an incoming call, cellular phone 200 may emanate a green glow.

Rate logic 215 may access preferences of preferences/icon(s) 220 to select outputs to indicate or represent a charge for a call. For instance, in response to placing an outgoing call, rate logic 215 may receive account information indicating that charges will apply to the call. Based upon content of preferences/icon(s) 220, rate logic 215 may select an icon, an audible alert, an illumination pattern, a color pattern, or the like to output from cellular phone 200. Rate logic 215 may transmit an instruction to output devices 222 to output the designated indication(s) for the charges. For example, in response to a free call, rate logic 215 may select an adjustment for an illumination pattern or color pattern projected from cellular phone 200 such as an illumination pattern for an icon projected onto a wall or the ceiling. For instance, a portion of the icon illuminated on the wall may move such as a seconds hand of an analog clock icon.

Furthermore, rate logic 215 may indicate an approaching or imminent change to the charge for a call. For example, if a call is utilizing anytime minutes or the time period associated with the current rate of charge is about to end, rate logic 215 may select one or more alerts to indicate that the anytime minutes will be depleted or that the time period is about to expire such as visual alerts, audible alerts, vibrating alerts, and/or alerts via other outputs. In many embodiments, rate logic 215 may also indicate the charges that will apply if the call continues after the anytime minutes depleted or time period expires.

In the present embodiment, the cellular phone 200 comprises a Bluetooth® module 247 and rate logic 215 may transmit data as an indication to a remote device via a Bluetooth® module 247 to indicate a charge for a call. For instance, the user of cellular phone 200 may maintain cellular phone 200 for work and implement a preference to send an email indicating charges for calls. In response to an incoming or outgoing call that is associated with a charge, rate logic 215 may transmit an instruction to Bluetooth® module 247 of other logic 245 to send an email indicating the charge.

SIM 219 may comprise a nonvolatile memory such as flash memory to store an SID and a subscriber identifier or their substantial equivalent. SIM 219 may also comprise nonvolatile or volatile memory to store information such as preferences, a contact list, and icons. The preferences may embody user customizations of behavior of cellular phone 200 under specified conditions such as indications regarding whether and under what conditions cellular phone 200 should indicate a charge for a call via illumination or color changes via display 270 and/or keypad 280, characters displayed on display 270, icons displayed via display 270, audible alerts via speaker 275, and/or vibrations via vibration module 277.

The contact list may have records including phone numbers and names and the records may be associated with icons such as icons indicating the carrier associated with the phone number or at least an icon indicating whether phone calls to the phone number are free based upon the last known carrier association. Preferences/icons 220 may include icons to indicate a carrier or that a carrier is different from the carrier associated with cellular phone 200. The icons may also include representations regarding charges, levels of charges, types of charges (such as fixed fees or rates of charge), or the like. For instance, an icon may include the face of an analog clock to indicate that the applicable charges for a call include a rate of charge and the color of the icon may indicate that the rate of charge is between $0.15 and $0.35 per minute. In other embodiments, the face may be green to indicate that the charges for a call are below a user-selected or predetermined threshold and the face may be red to indicate that the charges for a call are at or above a user-selected or predetermined threshold. In further embodiments, cellular phone 200 may project a countdown of remaining anytime minutes, a countdown of time remaining during a time period in which current charges apply, and/or a count of the current charges for the call.

Output devices 222 may be devices of cellular phone 200 that can output an indication of a charge. In the present embodiment, output devices 222 comprise display logic 225, display memory 230, audio logic 235, an audible alert library 240, other logic 245, a display 270, a speaker 275, a vibration module 277, and keypad 280. Display logic 225 may comprise hardware and code to generate an icon, characters, or other patterns on display 270. In particular, display logic 225 may receive an instruction from rate logic 215 to display a selected pattern on display 270 and display logic 225 may modify the contents of display memory 230 to generate the selected pattern on display 270. In some embodiments, display logic 225 may generate random or otherwise varying patterns on display 270.

Audio logic 235 may generate an audible alert via speaker 275 in response to an instruction from rate logic 215. For example, rate logic 215 may receive an indication that a rate of charge applies to an incoming call. Based upon a user preference in preferences/icon(s) 220, the user has indicated that a particular music file should be played in response to an incoming call associated with a rate of charge so rate logic 215 transmits an instruction to audio logic to play the particular music file. Responsively, audio logic 235 may access the particular music file in audible alert library 240 and generate the music via speaker 275. In some embodiments, the audio logic 235 may generate a beep or the like to indicate the alert. In further embodiments, audible alert library 240 may include voice data and audio logic 235 may generate a voice with the voice data to state whether or not a charge applies. In many embodiments, the voice may state the charge or charges that apply to an incoming or outgoing call.

Other logic 245 may implement other forms of outputs. For example, other logic 245 may comprise Bluetooth® module 247 and illumination/color module 249. Bluetooth® module 247 may implement a wireless communication with a remote device such as transmitting a data file to a printer or data storage device.

Illumination/color module 249 may be responsive to rate logic 215 to indicate a charge associated with an incoming or outgoing call by generating one or more patterns of illumination or brightness across display 270 and/or light source(s) 282 of keypad 280. For instance, when initiating an outgoing call, rate logic 215 may receive up-to-date information regarding the carrier of the cellular phone being called, the remaining anytime minutes, the location of cellular phone 200 in relation to the designated home location for cellular phone 200, and rates for the particular time period within which the call is being initiated. Rate logic 215 may process the information to determine whether a charge applies. If a charge applies, illumination/color module 249 may generate a pattern of light or a changing pattern of light representative of charges associated with the call. On the other hand, if no charge applies to the call, illumination/color module 249 may generate a pattern of colors indicative of a free call.

Figure 3:
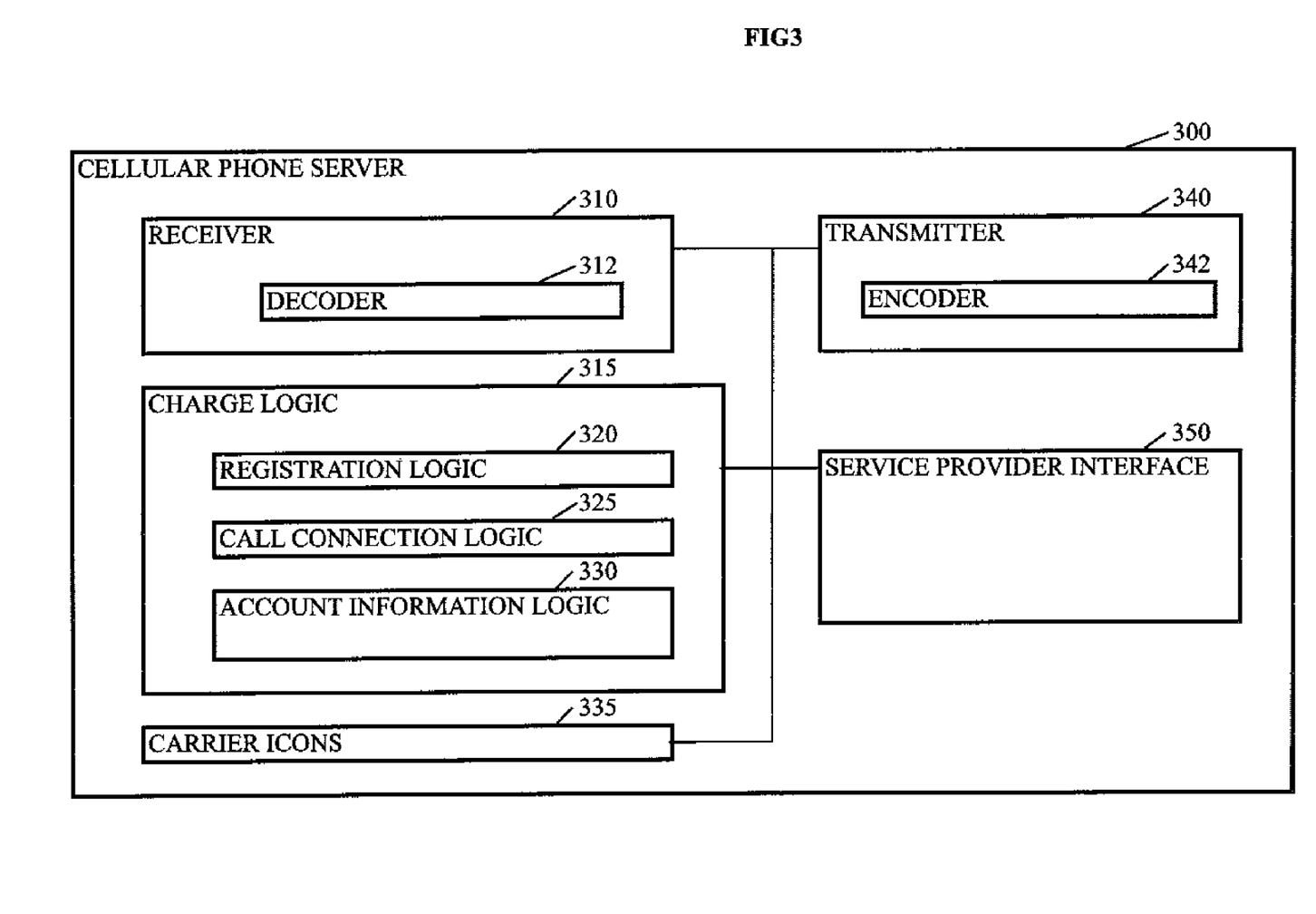
FIG. 3 illustrates an embodiment of a cellular phone server with logic to indicate a charge for a call.

Referring to FIG. 3, there is shown an embodiment of a cellular phone server 300 such as an MTSO with logic to indicate a charge for a call. Cellular phone server 300 may comprise hardware and code to gather account information related to a cellular phone call and transmit data based upon the account information to a cellular phone to indicate whether or not charges apply to calls to/from the cellular phone. In the present embodiment, cellular phone server 300 may transmit account information to a cellular phone related to charges associated with calls to and from the cellular phone in response to registration of the cellular phone with cellular phone server 300. For example, cellular phone server 300 may receive a registration packet from a mobile broadband card installed in a laptop. A receiver 310 may receive the packet and decoder 312 may decode the data in the packet. In response to the registration of the card, charge logic 315 may utilize information received in the data packet to access account information for the mobile broadband card. In some embodiments, charge logic 315 may periodically update the account information and instruct transmitter 340 to transmit updated charge information to the card while the card remains connected to cellular phone server 300. Transmitter 340 comprises encoder 342 to encode the data transmitted to the mobile broadband card prior to transmitting the data. In further embodiments, cellular phone server 300 may update account information in response to establishing a connection between the card and a wireless broadband service.

Charge logic 315 may gather account information and report data related to charges to a cellular phone, mobile broadband card, or the like. In the present embodiment, charge logic 315 may comprise registration logic 320, call connection logic 325, and account information logic 330. Registration logic 320 may gather account information in response to registration of a wireless device such as a cellular phone or mobile broadband card with cellular phone server

300. Registration logic 320 may gather information related to more than one rates of charge based upon time periods for the location at which the wireless device is registered. For example, registration logic 320 may determine a count of remaining anytime minutes, determine whether or not a rate of charge applies to calls within the current time period, and compare the number of anytime minutes to the time left within the current time period to determine which rates might apply to calls. In other embodiments, registration logic 320 may receive the account information and transmit the data related to charges to the wireless device to process.

Call connection logic 325 may gather account information from another cellular phone or mobile broadband card to determine whether a call to that device affects the charges applicable to the initiating wireless device and transmit that charge information to the initiating wireless device. In some embodiments, call connection logic 325 may also transmit account information to the wireless device being called. In further embodiments, call connection logic 325 may comprise logic to wait for acceptance of the charges from the initiating wireless device and/or the receiving wireless device after transmitting the corresponding account information.

Account information logic 330 may interact with a service provider via a service provider interface 350 to obtain account information related to one or more wireless devices. For example, account information logic 330 may parse a registration packet or a call connection request packet from a cellular phone, mobile broadband card, or the like, to determine the carrier and subscriber identification. With the carrier and subscriber identification, account information logic 330 may transmit a request for account information based upon the carrier and subscriber identification and receive information such as a verification of service, a number of remaining anytime minutes, a time frame within which a current rate of charge applies along with the current rate of charge, a subsequent rate of charge for a subsequent time period, and/or one or more alternative rates of charge either in the form of discrete rates or as a range of rates based upon modification of an assumed parameter for the calls. For example, the alternative rate of charge may comprise a rate of charge that is applicable for incoming or outgoing calls associated with a cell phone outside a "home" area designated in a service contract, which is typically associated with a geographical area.

Carrier icons 335 may be memory for storage of icons to associate with various carriers. Carrier icons 335 may comprise one or more icons and cellular phone server 300 may transmit the icons to wireless customers to provide an indication to generate on a display to inform the customers whether the cellular phone associated with an incoming call and/or outgoing call is associated with the same carrier or other carrier that is free of charge in accordance with the corresponding service contract.

Figure 4:
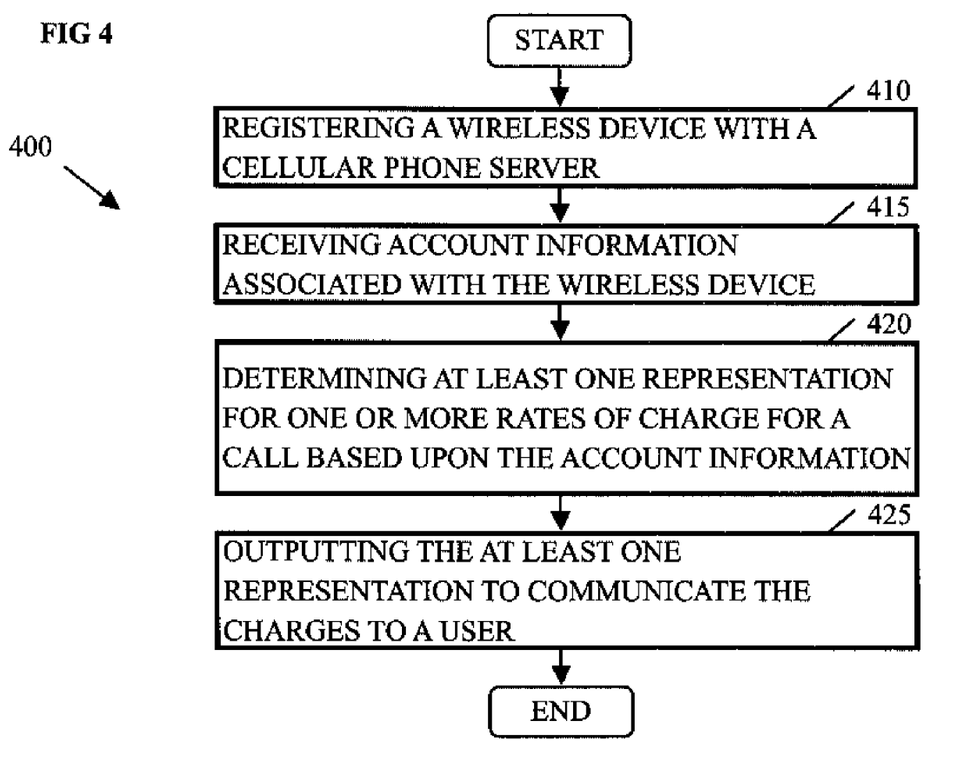
FIG. 4 illustrates a flow chart of an embodiment of a cellular phone registering with a cellular phone server.

FIG. 4 illustrates a flow chart 400 of an embodiment of a cellular phone registering with a cellular phone server. Flow chart 400 begins with registering a wireless device with a cellular phone server (element 410). For example, a cellular phone or mobile broadband card may be powered on. After an initial boot sequence, the cellular phone or mobile broadband card may search frequencies, locate an MTSO and transmit a registration packet including an SID and subscriber identifier. The MTSO may then verify service with the corresponding carrier and accept call or connection requests from the wireless device.

The cellular phone service provider may gather account information associated with the wireless device and the wireless device may receive the account information in the form of a data packet from the cellular phone server (element 415). In some embodiments, the packet may be encrypted or compressed so the wireless device may decrypt or decompress the data to access the data.

Rate logic of the wireless device may then process the data to determine at least one representation for one or more rates of charge for a call (element 420). In many embodiments, the cellular phone service provider processes the account information and transmits data indicative of the charges to the wireless device so the rate logic of the wireless device may process the indications of the charges in reference to preferences stored in the wireless device for outputting the charges to the user.

Once the wireless device determines the at least one representation for the charges, the wireless device may output the at least one representation via one or more output devices to communicate the charges to the user. For example, the wireless device may display the charges and/or conditional charges on a display connected to the wireless device, transmit the charges via another wireless protocol or universal serial bus (USB) port, project a representation of the charges from the wireless device, adjust the brightness or color pattern of the display, or any other change to an output that can be associated with the charges.

Figure 5:
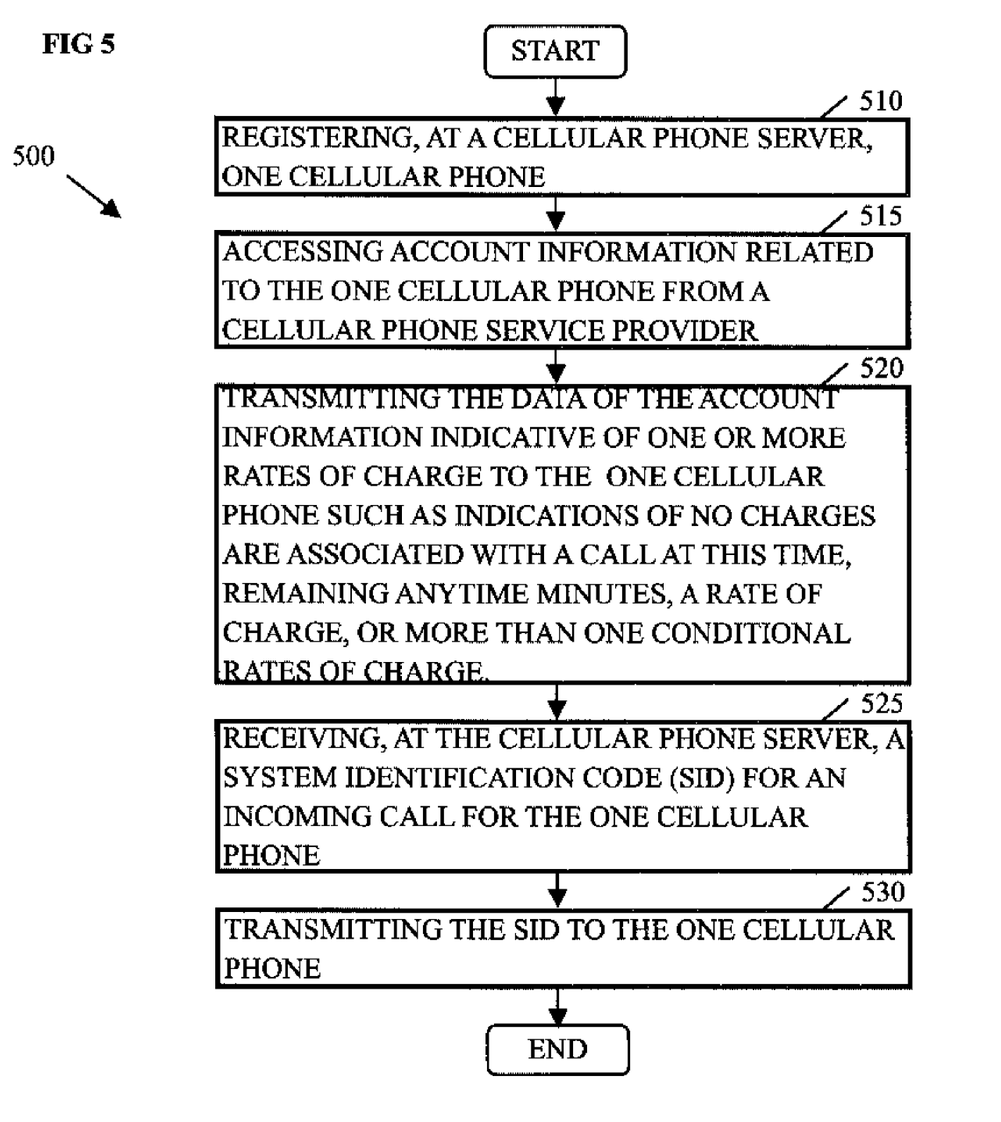
FIG. 5 illustrates a flow chart of an embodiment of a cellular phone server registering a cellular phone and connecting a call from another cellular phone.

FIG. 5 illustrates a flow chart 500 of an embodiment of a cellular phone server registering a cellular phone and connecting a call from another cellular phone. Flow chart 500 begins with registering one cellular phone with a cellular phone server (element 510). For example, a cellular phone may be powered on. After an initial boot sequence, the cellular phone may transmit a registration packet including an SID and subscriber identifier. The cellular phone server may verify service with the cellular phone service provider corresponding to the SID and transmit the subscriber identifier to the cellular phone service provider. Once service is verified, the cellular phone server may accept call or connection requests from the one cellular phone.

The cellular phone service provider may access account information associated with the one cellular phone (element 515) and transmit data of the account information to the one cellular phone (element 520). The data may be indicative of one or more rates of charge and fixed fees. For instance, the data may indicate that no additional charges with be incurred for a call at this time, remaining anytime minutes, a rate of charge, or more than one conditional rates of charge. In some embodiments, the cellular phone server receives the account information along with service verification. In other embodiments, the cellular phone server may request account information, or at least receive account information, after receipt of the verification of service.

In other embodiments, the cellular phone service provider processes the account information and transmits data indicative of the charges to the wireless device via the cellular phone server. In several embodiments, a cellular phone service provider may process the account information based upon variables provided to the cellular phone service provider from the cellular phone server to determine charges associated with calls or charges potentially or conditionally associated with calls. In particular, the cellular phone server may provide a cellular phone server identifier, along with charges that the cellular phone server may apply to the call. Based upon a contract with the cellular phone server and the service contract associated with the one cellular phone, the cellular phone service provider may return charges to the cellular phone server to provide to the one cellular phone. In still further embodiments, data related to conditional charges are transmitted to the one cellular phone for processing.

Once the cellular phone server verifies service for the one cellular phone, the one cellular phone may initiate or receive calls to/from another cellular phone. Upon receipt of an incoming call, for instance, the cellular phone server may receive an SID to identify the carrier associated with the other cellular phone (element 525) and transmit the SID to the one cellular phone (element 530). If the SID indicates the same carrier or another carrier associated with unlimited calls, the one cellular phone may indicate so to the user by outputting an indication associated with the carrier, with a free call, or with unlimited calls such as an icon and/or an audible alert.

Figure 6:
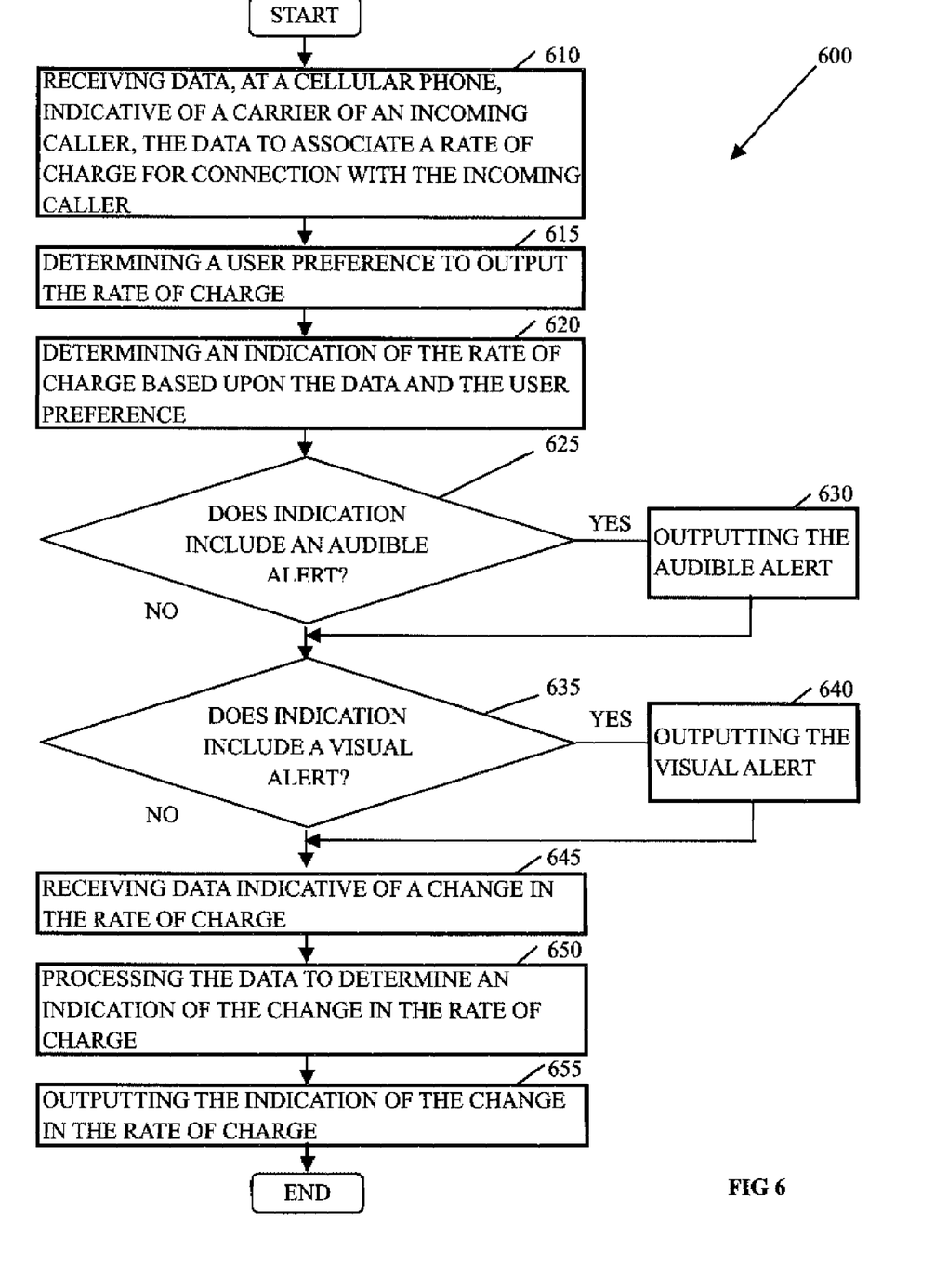
FIG. 6 illustrates a flow chart of an embodiment of a cellular phone processing data from a cellular phone server to indicate a charge for a call.

FIG. 6 illustrates a flow chart 600 of an embodiment of a cellular phone processing data from a cellular phone server to indicate a charge for a call. Flow chart 600 begins with receiving data, at a cellular phone, indicative of a carrier of an incoming caller, wherein the data associates a rate of charge for connection with the incoming caller (element 610). For instance, the cellular phone server may transmit the SID and/or a count of remaining anytime minutes to the cellular phone along with the indication of an incoming call.

The cellular phone may determine a user preference for outputting the rate of charge by accessing preferences and/or default settings stored in memory of the cellular phone (element 615). Rate logic of the cellular phone may then process the charges or charge information to determine an indication to output the charges to the user based upon the preferences (element 620).

If the indication determined by the rate logic includes an audible alert (element 625), the rate logic may transmit an instruction to audio logic to generate the audible alert. The audio logic may then access an audio file to generate the audio alert. Furthermore, if the indication determined by the rate logic includes a visual alert (element 635), the rate logic may transmit an instruction to display logic to generate the visual alert and the display logic may output the visual alert via a display, LEDs, or other output devices that can produce a visual indication of the charges (element 640).

While connected to the cellular phone server, the cellular phone may receive updated account information that represent a change in the rate of charge for an ongoing call or a call subsequently initiated (element 645). In response, rate logic may process the account information and select or otherwise determine an indication of the change in the rate of charge (element 650). The rate logic may then transmit instructions to output the indication of the rate of charge (element 655).

Another embodiment of the invention is implemented as a program product for implementing a "soft phone" on a computer or for installation on hardware of a cellular phone server such as systems and methods described with reference to FIGS. 1-6. The invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can store the program for use by or in connection with the instruction execution system, apparatus, or device.

The medium can be an electronic, magnetic, optical, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem, and Ethernet adapter cards are just a few of the currently available types of network adapters.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It will be apparent to those skilled in the art having the benefit of this disclosure that the present disclosure contemplates methods and arrangements for indicating a charge for a call. It is understood that the form of the embodiments shown and described in the detailed description and the drawings are to be taken merely as examples. It is intended that the following claims be interpreted broadly to embrace all variations of the example embodiments disclosed.

Although the present disclosure and some of its advantages have been described in detail for some embodiments, it should be understood that various changes, substitutions, and alterations can be made herein without departing from the spirit and scope of the disclosure as defined by the appended claims. Although specific embodiments of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer program product for indicating a charge for a call, the computer program product comprising:
   a computer readable storage device;
   first program instructions to receive, at a cellular phone server, a registration packet from one wireless device;
   second program instructions to access account information related to the one wireless device from a cellular phone service provider, wherein the account information comprises data related to remaining minutes available for which no charge will incur for use;
   third program instructions to transmit the data to the one wireless device;
   fourth program instructions to receive a request from the one wireless device to establish a connection with a second wireless device;
   fifth program instructions to transmit a system identification code (SID) of the one wireless device to the second wireless device;
   sixth program instructions to transmit an SID of the second wireless device to the one wireless device; and
   wherein the first, second, third, fourth, fifth, and sixth program instructions are stored on the computer readable storage device.

2. The computer program product of claim 1, further comprising seventh program instructions to transmit an indication to the one wireless device related to a pending change in a rate of charge for a connection with a second wireless device; and wherein the seventh program instructions are stored on the computer readable storage device.

3. The computer program product of claim 1, wherein the third program instructions to transmit the data transmit one or more charges to the one wireless device based upon the cellular phone server and a service contract associated with the one wireless device and the cellular phone service provider.

* * * * *